United States Patent
Bozak et al.

(10) Patent No.: US 7,661,030 B2
(45) Date of Patent: Feb. 9, 2010

(54) PROPAGATING DEBUG INFORMATION IN A WEB SERVICES ENVIRONMENT

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 717 days.

(21) Appl. No.: 11/000,349

(22) Filed: Nov. 30, 2004

(65) Prior Publication Data

US 2006/0129885 A1 Jun. 15, 2006

(51) Int. Cl.
*G06F 11/00* (2006.01)
(52) U.S. Cl. .............................. 714/25; 714/27; 714/43
(58) Field of Classification Search .................. 714/25, 714/26, 27, 30, 43
See application file for complete search history.

(56) References Cited

U.S. PATENT DOCUMENTS

| | | | | |
|---|---|---|---|---|
| 5,825,751 A | * | 10/1998 | Papierniak et al. | .......... 370/248 |
| 7,209,548 B2 | * | 4/2007 | Ethier et al. | ............. 379/32.05 |
| 2003/0014691 A1 | * | 1/2003 | Abdelilah et al. | ............. 714/25 |
| 2004/0083304 A1 | * | 4/2004 | Usuki | .......................... 709/238 |
| 2004/0199586 A1 | * | 10/2004 | Kaler et al. | ................. 709/206 |
| 2004/0260820 A1 | * | 12/2004 | Bearman | ..................... 709/229 |
| 2005/0038855 A1 | * | 2/2005 | Martin et al. | ................ 709/206 |

* cited by examiner

*Primary Examiner*—Joshua A Lohn
(74) *Attorney, Agent, or Firm*—Finnegan, Henderson, Farabow, Garrett & Dunner LLP (57) ABSTRACT

A system is disclosed for obtaining debug information in a network that supports Web services. The system includes a first service host to send a first message, where the first message contains data corresponding to a request for debug information. The system also includes a second service host to receive the first message and to send a second message to a third service host in response to the first message, where the second message contains data corresponding to a request for debug information. The second service host receives a reply to the second message from the third service host, where the reply to the second message includes third debug information associated with the third service host, and the second service host generates a reply to the first message. The reply to the first message includes the third debug information and second debug information associated with the second service host.

17 Claims, 6 Drawing Sheets

PROPAGATING DEBUG INFORMATION IN A WEB SERVICES ENVIRONMENT

TECHNICAL FIELD

The present invention relates to data processing by digital computer, and more particularly to propagating debug information in a web services environment

BACKGROUND

"Web services" is a generic term that describes a way of integrating Web-based applications using open standards, such as XML (extensible Markup Language), SOAP (Simple Object Access Protocol), WSDL (Web Services Description Language) and UDDI (Universal Description, Discovery and Integration). XML is used to tag (i.e., define) data sent between applications, SOAP is used to transfer the data, WSDL is used to describe available services, and UDDI is used to list the available services.

Figure 1:
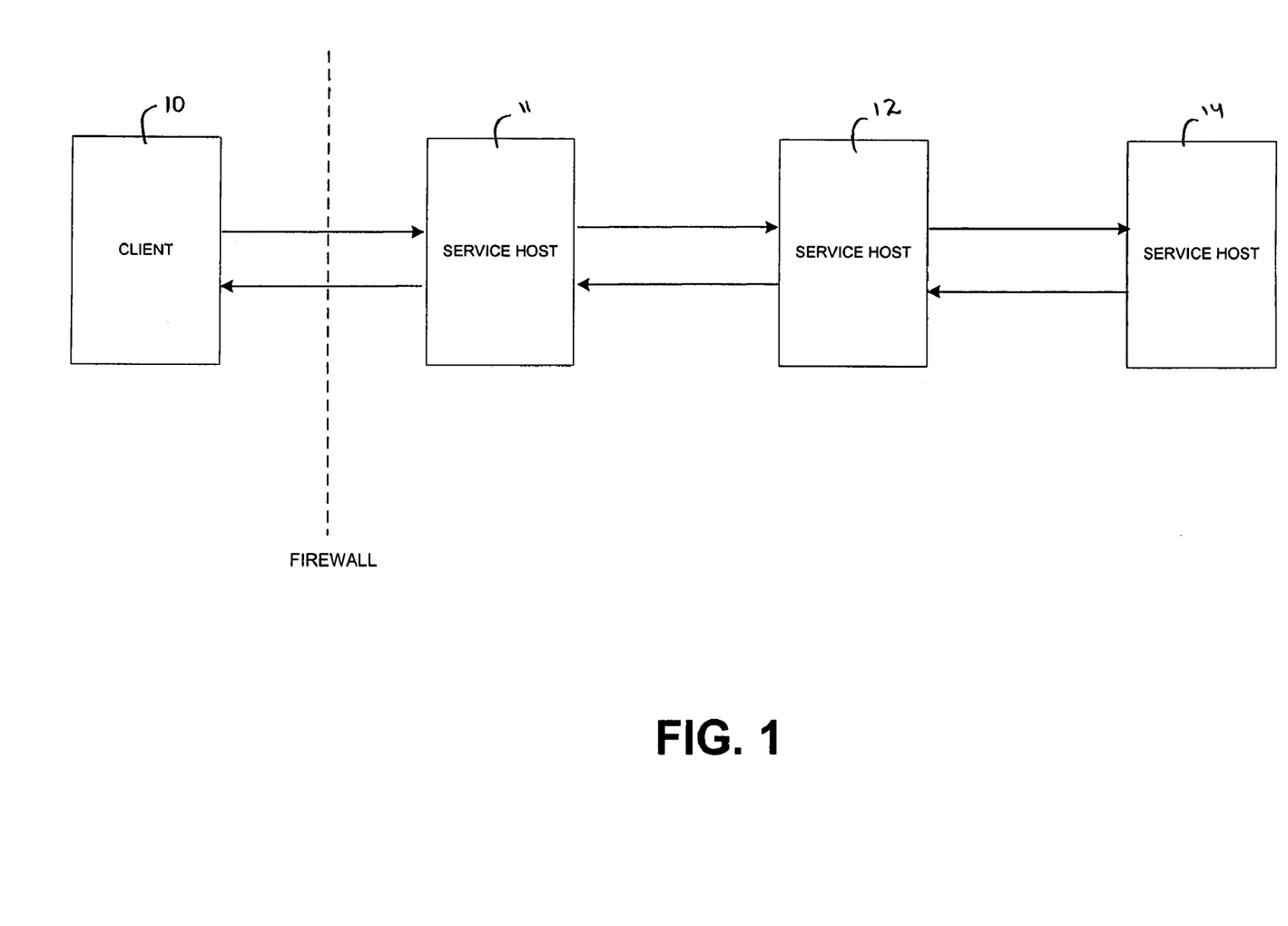
FIG. 1 is a block diagram of a network through which Web services can be accessed.

Web services can be distributed over various computer networks and typically, although not necessarily, involves communication over the Internet. Users can access Web service hosts through a peer-to-peer arrangement rather than through a central server. Some Web service hosts have the ability to communicate with other Web service hosts directly, i.e., without user intervention. A class of software known as middleware supports this functionality. For example, as shown in FIG. 1, a user at client 10 may request data or other services from service host 11. Service host 11 may, in turn, call a second service host 12 in order to satisfy the request. Likewise, service host 12 may call a third service host 14 in order to satisfy the request of service host 11, and so on. The user, however, is generally unaware that service host 11 relies on other service host(s) to satisfy the initial request.

The foregoing arrangement can be problematic, particularly if one of the other service host(s) is having problems. More specifically, because the other service host(s) are "transparent" to client 10, there is no way, from client 10, to identify those other service host(s) or to diagnose any problems associated therewith.

SUMMARY

The present invention provides methods and apparatus, including computer program products, for propagating debug information In general, in one aspect, the invention is directed to method, performed by a target service host, for propagating debug information in a network that supports Web services. The method includes receiving, from a first service host, a first message corresponding to a request for debug information, and sending, to a second service host, a second message in response to the first message. The second message contains second data corresponding to a request for debug information. The method also includes receiving a reply to the second message, where the reply to the second message comprises second debug information associated with the second service host, and sending a reply to the first message. The reply to the first message comprises the second debug information and current debug information associated with the target service host.

By incorporating debug information into message replies in the manner set forth above, the invention enables users to obtain debug information relating to service hosts that otherwise would not have been available. The invention has particular applicability in a Web services environment, in which service hosts rely on other, external services that an original requestor may be unaware of or unable to trace.

The foregoing aspect of the invention may include one or more of the following features. The current debug information may identify one or more of the target service host, an operation performed by the target service host, and the first message. The second debug information may identify one or more of the second service host, an operation performed by the second service host, and the second message. The current debug information may comprise a network address of the target service host, and the second debug information may comprise a network address of the second service host. The first message may comprise first data stored in a header of the first message, and the second data may be stored in a header of the second message. The first data and the second data each may comprise a bit that is set to indicate a request for debug information.

In general, in another aspect, the invention is directed to a method, performed by a target service host, for propagating debug information in a network that supports Web services. The method includes receiving a first message containing an instruction to log debug information and a first identifier that corresponds to an activity performed by a sender of the first message, and logging debug information for the target service host in accordance with the instruction. The debug information is logged with a combination of the first identifier and a second identifier that corresponds to an activity performed by the target service host. The method also include sending a second message to a second service host, where the second message comprises an instruction to log debug information and the combination of the first identifier and the second identifier.

By logging debug information in the manner set forth above, the invention enables users to obtain debug information relating to service hosts that otherwise would not have been available. By logging debug information in a server, this aspect reduces the amount of data that propagates through the network, making this aspect particularly advantageous for large networks involving numerous calls to service hosts.

The foregoing aspect of the invention may include one or more of the following features. The instruction may comprise information associated with a trace server, and the debug information may be logged in the trace server. The information associated with the trace server may comprise a network address of the trace server. The method may also include receiving a reply to the second message from the second service host, where the reply to the second message comprises a network address of the second service host, and sending a reply to the first message. The reply may comprise the network address of the second service host and a network address of the target service host.

In general, in another aspect, the invention is directed to a method, performed by a client, of obtaining debug information in a network that supports Web services and that comprises at least a first service host and a second service host that is called by the first service host in response to a message. The method includes sending the message to the first service host, and receiving the debug information in a reply to the message. The message contains data that corresponds to a request for the debug information, and the debug information comprises information relating to the first service host and information relating to the second service host.

The foregoing aspect may also include one or more of the following features. The information relating to the first service host may identify one or more of the first service host, an operation performed by the first service host, and the message. The information relating to the second service host may identify one or more of the second service host, an operation performed by the second service host, and a message sent between the first service host and the second service host. The data may comprise at least one bit in a header of the message, where the at least one bit is set to indicate a request for debug information. The network may comprise N (N>2) service hosts, each of which receives, from an N−1$^{th}$ service host, a message requesting debug information from an N$^{th}$ service host, and the debug information may comprise information relating to each of the N service hosts.

In general, in another aspect, the invention is directed to a method, performed by a client, of obtaining debug information in a network that supports Web services and that comprises at least a first service host and a second service host that is called by the first service host in response to a message. The method comprises sending the message to the first service host, where the message contains data instructing the first service host to log debug information at a network address. A trace file is retrieved from the network address that was generated in response to the message. The trace file contains an entry comprising a first identifier that corresponds to the first service host and an entry comprising the first identifier and a second identifier that corresponds to the second service host. The method also includes obtaining the first identifier and the second identifier from the trace file, and identifying activities performed in response to the first message based on at least one of the first identifier and the second identifier.

The foregoing aspect may also include one or more of the following features. The network may comprise N (N>2) service hosts, each of which receives, from an N−1$^{th}$ service host, a message containing data instructing an N$^{th}$ service host to log debug information at the network address. The trace file may contain N entries corresponding to each of the N services hosts, where an entry for an N$^{th}$ service host comprises an identifier that corresponds to the N$^{th}$ service host and identifiers that correspond to a first service host through an N−1$^{th}$ service host that precede the N$^{th}$ service host in a communication path from the client to the N$^{th}$ service host. Obtaining the first identifier and the second identifier from the trace file may include obtaining N identifiers corresponding to the N service hosts, and identifying the activities may include identifying activities performed in response to the first message based on at least one of the N identifiers. The activities may be identified by searching the trace file using the first identifier to obtain a trace of all activities performed in response to the first message.

The foregoing aspect may also include receiving, in a reply to the first message, first information identifying the first service host and second information identifying the second service host. The first information may be a network address of the first service host and the second information may be a network address of the second service host.

Other features and advantages described herein will be apparent from the description, the drawings, and the claims.

DESCRIPTION OF THE DRAWINGS

Like reference numerals in different figures indicate like elements.

DETAILED DESCRIPTION

Figure 2:
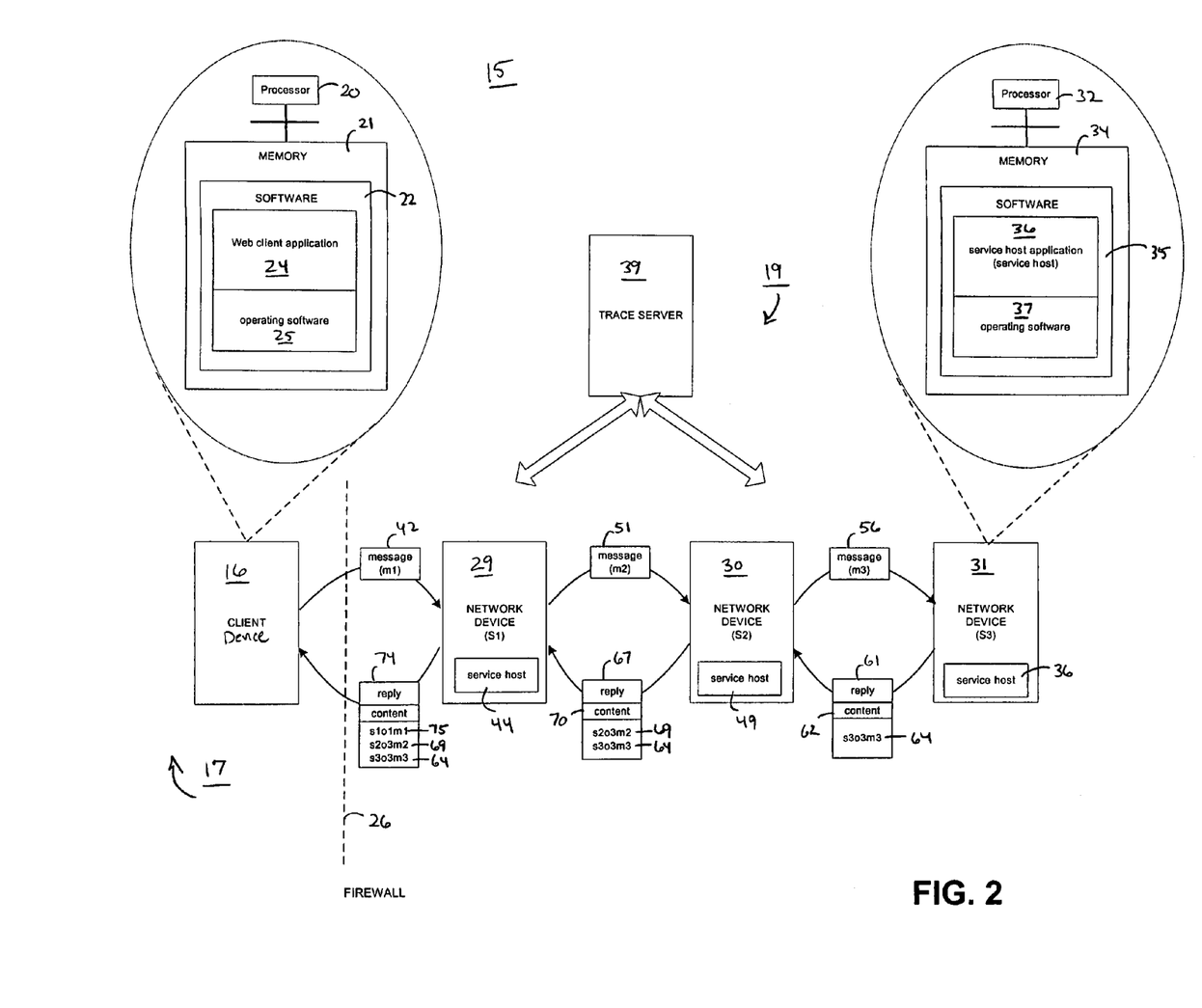
FIG. 2 is a block diagram of a network on which the debug propagation processes described herein may be implemented.

As shown in FIG. 2, network 15 includes a device 16. Device 16 may be any type of Web-enabled apparatus or system. Examples of such apparatuses or systems include, but are not limited to, a desktop computer, a laptop computer, a mainframe computer, a cellular telephone, a personal digital assistant (PDA), and a controller embedded in an otherwise non-computing device.

Device 16 may be connected to an internal network 17, such as a local area network (LAN). A router or gateway (not shown) may couple internal network 17 to an external network 19, such as the Internet/World Wide Web. Alternatively, device 16 may be coupled directly to external network 19. External network 19 executes transmission control protocol/internet protocol (TCP/IP) or any other suitable protocol. Network connections may be via Ethernet, telephone line, wireless, or other transmission media.

Device 16 contains one or more processor(s) 20 (referred to simply as "processor 20") and memory 21 for storing software 22. Processor 20 executes software 22, which includes Web client application 24 (or simply "client 24") and operating software 25. Client 24 includes one or more routines used in implementing the TCP/IP protocol, which allows device 16 to communicate over the internal and external networks. Client 24 also includes one or more routines to implement the processes described below for requesting and obtaining debug information from external network 19. Operating software 25 may include an operating system, such as Windows XP®, a Web browser, such as Internet Explorer®, and various other application programs.

A firewall 26 may be present between internal network 17 and external network 19. Firewall 26 may be implemented by software on device 16 or by software on a gateway, router, or the like (not shown) between internal network 17 and external network 19.

External network 19 may include one or more networks, such as wide area networks (WANs), LANs, wireless networks, and the like, which may or may not be linked by the Internet. External network may include one or more network devices 29 to 31, which are programmed with software to support Web services. Although only three network devices are shown in FIG. 2, any number of network devices may be provided. The network devices may be on the same, or different, networks.

Network devices 29 to 31 may be any type of computing devices (e.g., servers), and may have the same or different architectures. For the purposes of the present description, it is assumed that each of network devices 29 to 31 includes one or more processor(s) 32 (referred to simply as processor 32) and memory 34 that stores software 35. Processor 32 executes software 35, which includes service host application 36 (or simply "service host 36") and operating software 37. Service host application 36 includes one or more routines to support Web services, e.g., to provide access to data and other services using XML, SOAP, WSDL, UDDI and/or other suitable protocols. Service host application 36 also includes one or more routines to implement the processes described below for propagating debug information through external network 19. Operating software 37 includes, but is not limited to, an operating system and one or more routines for effecting (e.g., TCP/IP-based) communication over external network 19.

External network 19 also includes a trace server 39. Trace server 39 contains system memory that is accessible to both device 16 and network devices 29 to 31. As described below, trace server 39 receives data (referred to below as "debug information") from network devices 29 to 31 and allows that data to be accessed by client 24.

Figure 3:
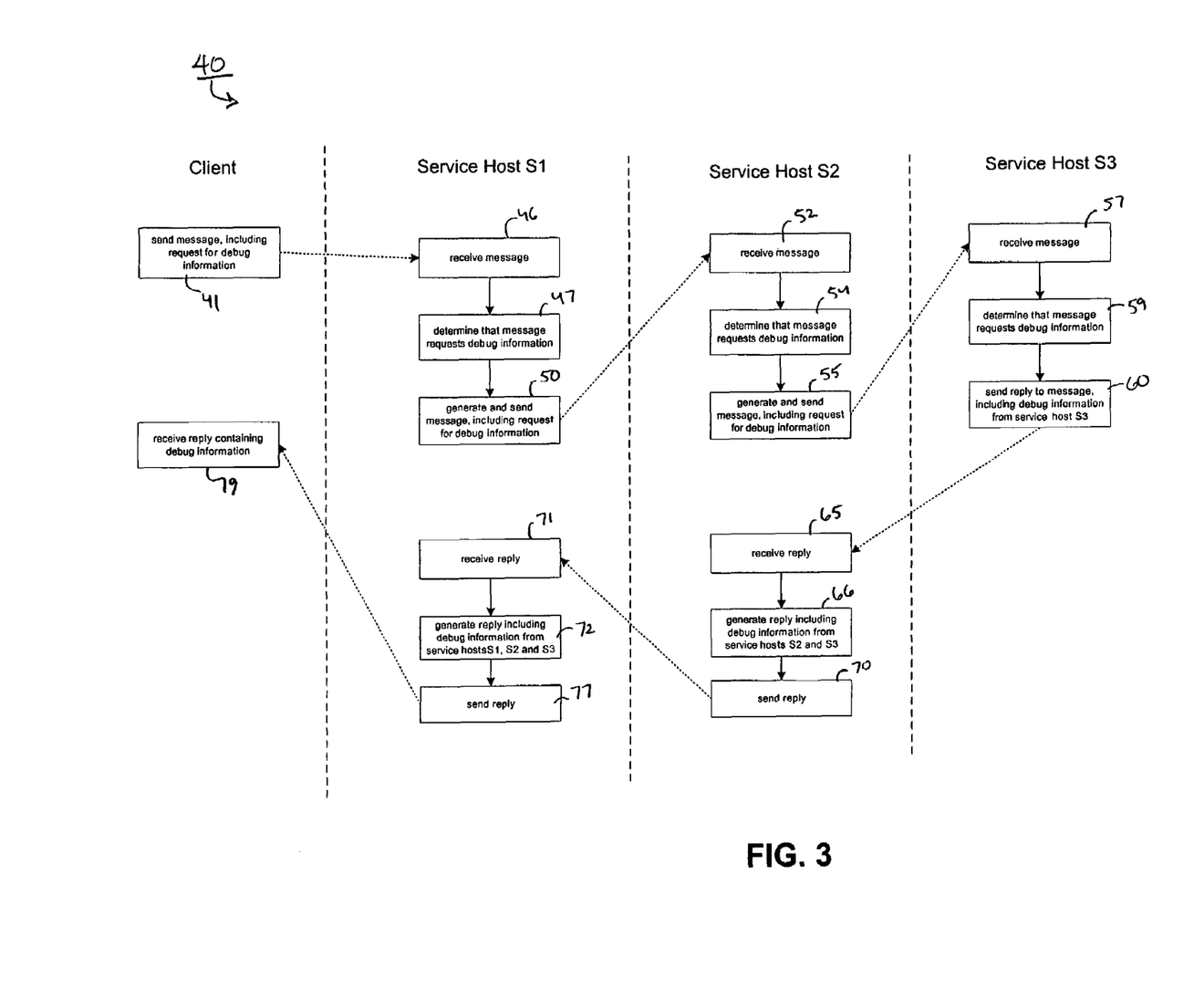
FIG. 3 is a flowchart showing one example of a debug propagation process that may be implemented on the network of FIG. 2.

FIG. 3 is a flowchart showing a process 40 for propagating debug information through external network 19 to client 24. According to process 40, client 24 generates and sends (41) a message 42 (M1) to service host 44 in computer 29. Message 42 requests data or other Web services available via service host 44. When generating message 42, client 24 adds, to the message, data corresponding to a request for debug information. In this embodiment, the data is a bit that is set in a SOAP header of the message. For example, the bit may be set to "1" to indicate that debug information is requested, or to "0" to indicate that debug information is not requested. Although a bit in a SOAP header is described, any other type of flag may be used. "Debug information", in this context, refers to any information that relates to message 42 and/or to any messages that result from, or services that are invoked as a result of, message 42. Debug information may specify, e.g., the identity of each service host contacted as a result of message 42, an operation performed by each service host, and a message corresponding to each service host/operation.

Service host 44 (S1) receives (46) message 42 and determines (47) that message 42 is requesting debug information based on the relevant bit in message 42's SOAP header. Thus, in message 42, the request for debug information is implicit, in the sense that the request is indicated by a bit value in the message's header. Service host 44 also reviews the content of message 42, e.g., by parsing XML contained in the message, in order to determine what is being requested by message 42. In this example, service host 44 is unable to satisfy the entire request on its own. Therefore, service host 44 invokes another Web service by contacting service host 49 in device 30.

More specifically, service host 44 generates and sends (50) a message 51 (M2) to service host 49 (S2). As for all service hosts described herein, service host 44 maintains a record of the correlation between incoming and outgoing messages that are in the same invocation context. That is, if an outgoing message is sent to a service host in response to an incoming message, service host 44 correlates the incoming and outgoing messages.

When generating message 51, service host 44 indicates, in message 51, that debug information is requested. Service host 44 requests debug information because the original message 42 from client 24 also requested debug information. As above, service host 44 requests debug information by setting a bit in the SOAP header of message 51. It is noted that service host 44 contacting service host 49 is an example of a Web service contacting another Web service without the direct intervention of a user (e.g., a person at device 29).

Service host 49 receives (52) message 51 and determines (54) that the message requests debug information based on the relevant bit in message 51's SOAP header. Service host 49 also reviews the content of message 51, e.g., by parsing XML contained in the message, in order to determine what is being requested by the message. In this example, service host 49 is unable to satisfy the entire request on its own. Therefore, service host 49 invokes another Web service by contacting service host 36.

More specifically, service host 49 generates and sends (55) a message 56 (M3) to service host 36 (S3). When generating message 56, service host 49 indicates, in message 56, that debug information is requested. Service host 49 requests debug information because the original message 42 from client 24 also requested debug information. Service host 49 requests debug information by setting a bit in the SOAP header of message 56.

Service host 36 receives (57) message 56 and determines (59) that message 56 requests debug information based on the relevant bit in the message's SOAP header. Service host 36 also reviews the content of message 56, e.g., by parsing XML contained in the message, in order to determine what is being requested by the message. In this example, service host 36 is able to satisfy the request on its own. Accordingly, service host 36 sends (60) a reply 61 to message 56. Reply 61 contains content 62 and debug information 64. In this embodiment, service host 36 embeds debug information 64 in the SOAP header of message 61. It is noted, however, that process 40 is not limited to embedding debug information in this manner; debug information may be passed by any suitable method. Debug information 64 specifies an identity (S3) of service host 36, operation(s) performed (O3) by service host 36, and a message (M3) to which reply 61 is a response. The identity of service host 36 may include, e.g., a network address, such as an Internet Protocol (IP) address, of device 31 and/or any other information. In this example, the debug information comprises "tracing information", meaning information that traces, through external network 19, messages and the like resulting from the original message 42.

Service host 36 sends (60) reply 61 to service host 49 in response to message 56. Service host 49 receives (65) reply 61, extracts whatever content is needed to satisfy message 51 (from service host 44), and generates (66) a reply 67 to message 51. Reply 67 includes, in its SOAP header, debug information 64 from service host 36, namely S3,O3,M3, and debug information 69 from service host 49. As was the case above, the debug information 69 from service host 49 specifies an identity (S2) of service host 49, operation(s) performed (O2) by service host 49, and a message (M2) to which reply 67 is a response. The identity of service host 49 may also include, e.g., an IP address, of device 30 and/or any other identifying information.

Service host 49 sends (70) reply 67 to service host 44 in response to message 51. Service host 44 receives (71) reply 67, extracts whatever content is needed to satisfy message 42 (from client 24), and generates (72) a reply 74 to message 42. Reply 74 includes, in its SOAP header, debug information 64 from service host 36, namely S3,O3,M3, debug information 69 from service host 49, namely S2,O2,M2, and debug information 75 from service host 44. The debug information from service host 44 specifies the identity (S1) of service host 44, the operation(s) performed (O1) by service host 44, and the message (M1) to which the reply is a response. The identity of service host 44 may also include, e.g., an IP address, of device 29 and/or any other identifying information.

Service host 44 sends (77) reply 74 to client 24 in response to message 42. Client 24 receives (79) reply 74 containing a response to its original request 42 and also containing the debug information S3,O3,M3; S2,O2,M2; and S1,O1,M1. Thus, by propagating debug information using process 40, a user at device 16 is able to trace the services, operations, and messages resulting from the original request (message 42).

Figure 4:
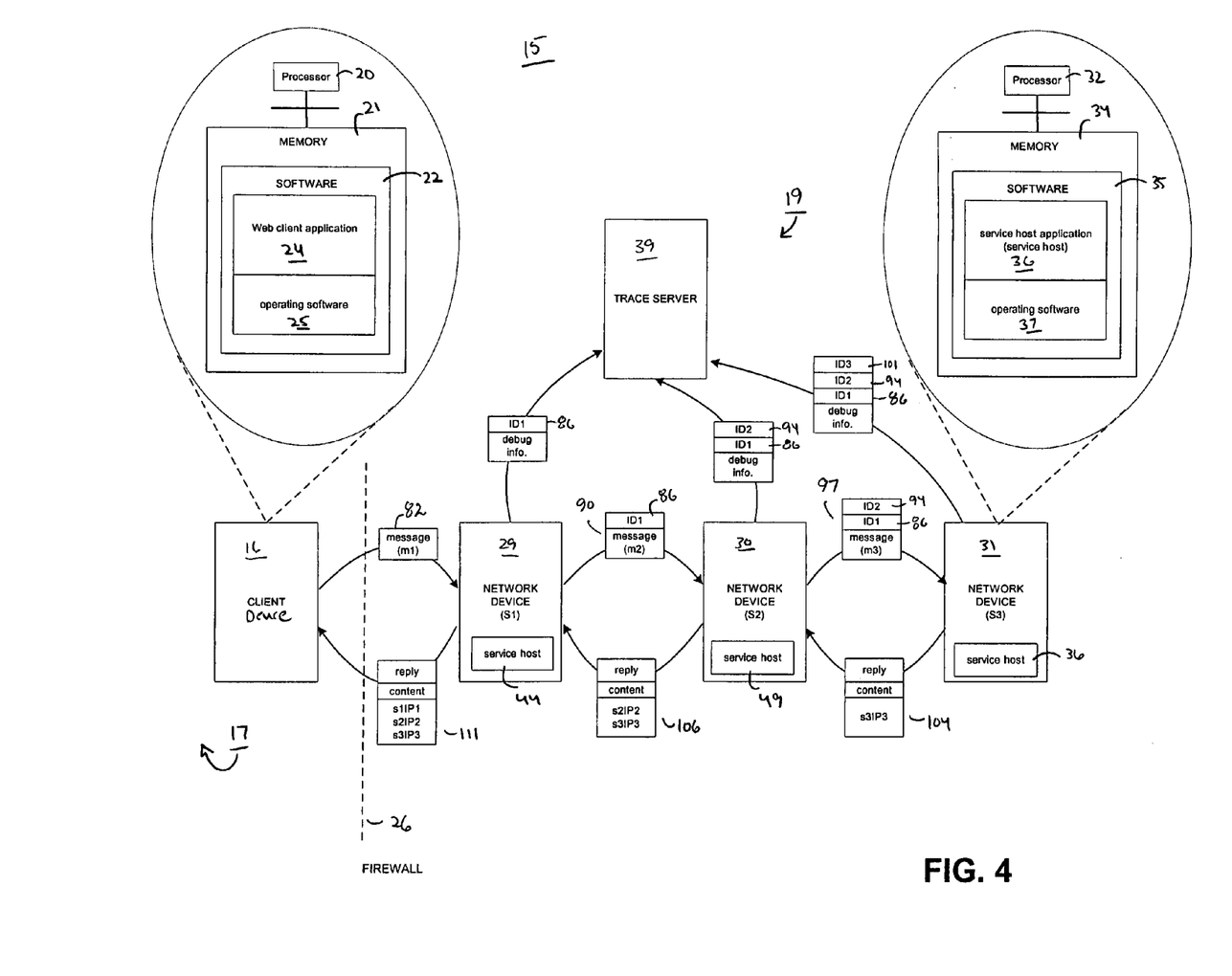
FIG. 4 shows the network of FIG. 1 with different messages than in FIG. 2.
Figure 5:
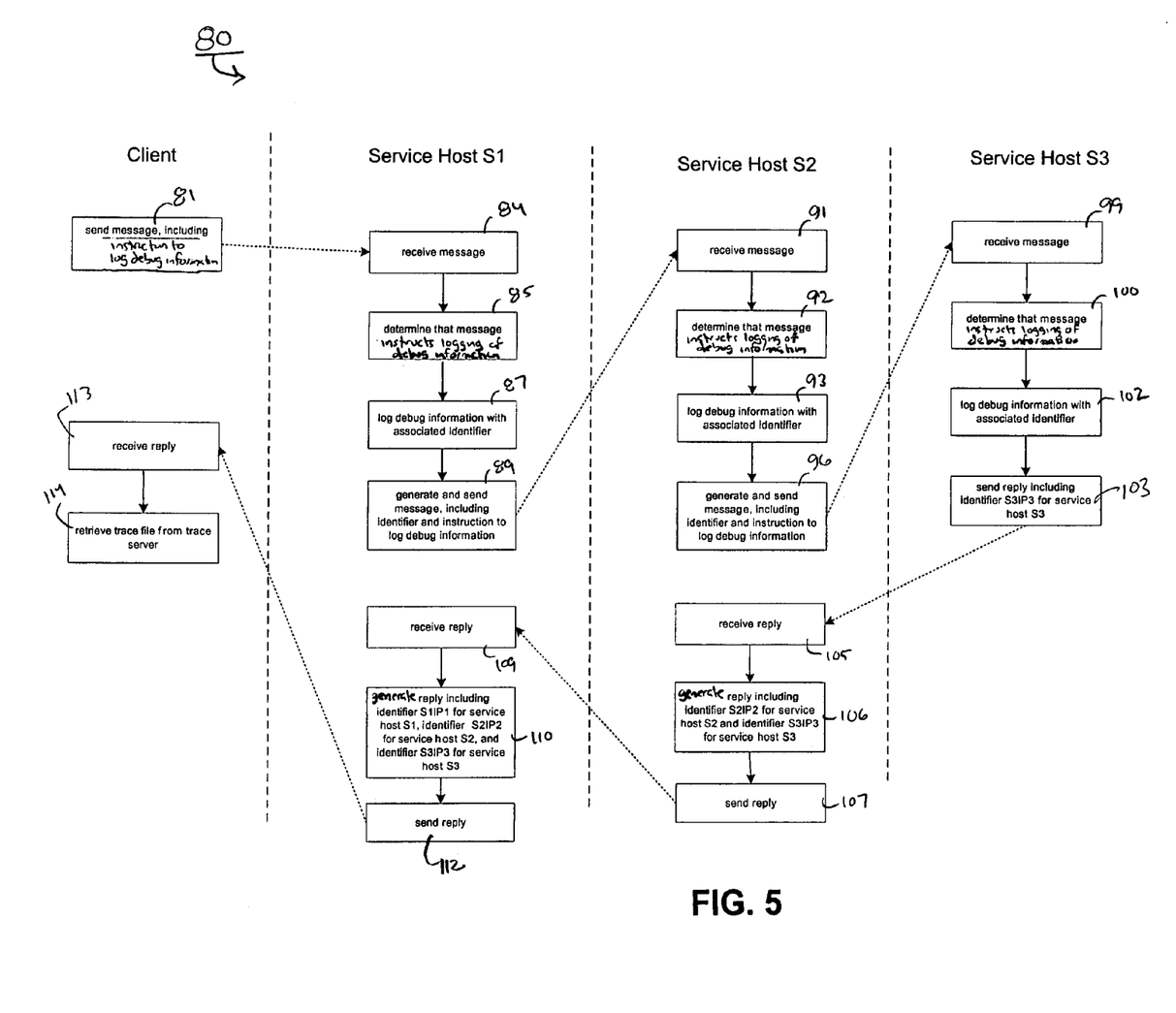
FIG. 5 is a flowchart showing one example of a debug propagation process that may be implemented on the network of FIG. 4.

FIG. 5 is a flowchart showing another process 80 for propagating debug information through external network 19. As shown in FIG. 4, process 18 makes use of trace server 39, which need not be employed in process 40.

In process 80, client 24 generates and sends (81) a message 82 (M1) to service host 44 (S1). Message 82 requests data or other Web services available via service host 44. When generating message 82, client 24 adds, to message 82, data that comprises an instruction to log debug information. The data may be an instruction, in the SOAP header of message 82, identifying an IP address of trace server 39 (to which the debug information is to be logged). Alternatively, the data may be a bit in the SOAP header that is set to "1" to indicate that debug information is to be logged, or that is set to "0" to indicate that debug information is not to be logged. This alternative may be used, e.g., if each service host is pre-programmed with the IP address of trace server 39. The following, however, assumes that the IP address of trace server 39 is passed between service hosts.

Service host 44 receives (84) message 82 and determines (85) that message 82 contains an instruction to log debug information based on information in message 82's SOAP header. Service host 44 also reviews the content of message 82, e.g., by parsing XML contained in the message, in order to determine what is being requested by message 82. In this example, service host 44 performs whatever activities are required to satisfy the request of client 24, including contacting other service host(s). Service host 44 logs (87) these activities in trace server 39, along with any other relevant information, such as the IP address of device 29 and times of the activities. This information constitutes debug information for service host 44. Service host also logs an identifier 86 (ID1) in association with its activities and other information. Identifier 86 may be used in retrieving trace files from trace server 39 that relate to the original message 82, as described below.

When contacting another service host 49, service host 44 generates and sends (89) a message 90 (M2) to service host 49 (S2). Service host 44 embeds, in message 90, an instruction that debug information is to be logged. The instruction may include, e.g., the IP address of trace server 39 in the SOAP header of message 90. Service host 44 instructs service host 49 to log debug information because the original message 82 from client 24 also requested debug information. Service host 44 also passes its identifier 86 (ID1) in message 90. The identifier may be embedded in the message's SOAP header.

Service host 49 receives (91) message 90 and determines (92) that message 90 contains an instruction to log debug information based on relevant information in message 90's SOAP header. Service host 49 also reviews the content of message 90, e.g., by parsing XML contained in the message, in order to determine what is being requested by the message. In this example, service host 49 performs whatever activities are required to satisfy message 90, including contacting other service host(s). Service host 49 logs (93) these activities in trace server 39, along with any other relevant information, such as the identity of device 30 and times of the activities. This information constitutes the debug information for service host 49. Service host 49 also logs an identifier 94 (ID2) and the identifier 80 of the previous service host 44 (ID1) in association with its debug information. Thus, the debug information for service host 49 has a combination of identifiers ID1 and ID2 associated therewith in trace server 39.

When contacting another service host 36, service host 49 generates and sends (96) a message 97 (M3) to service host 36 (S3). Service host 49 embeds, in the message, an instruction that debug information is to be logged. As above, the instruction may include, e.g., the IP address of trace server 39 in the SOAP header of message 97. Service host 49 instructs service host 36 to log debug information because the original message 82 from client 24 also requested debug information.

Service host 49 also passes its identifier 94 (ID2) and the identifier of the previous service host 44 (ID1 86) in message 97. These identifiers may be embedded in the message's SOAP header.

Service host 36 receives (99) message 97 and determines (100) that the message contains an instruction to log debug information based on the relevant information in the message's SOAP header. Service host 36 also reviews the content of the message, e.g., by parsing XML contained in the message, in order to determine what is being requested by the message. In this example, service host 36 performs whatever activities are required to satisfy the request of service host 49, including contacting other service host(s). Service host 36 logs (102) these activities in trace server 39, along with any other relevant information, such as the identity of device 31 and times of the activities. This information constitutes the debug information for service host 36. Service host 36 also logs an identifier 101 (ID3) and identifiers of the two previous service hosts, namely ID1 and ID2, in association with its debug information. Thus, debug information of service host 36 has a combination of identifiers ID1, ID2 and ID3 associated therewith in trace server 39.

In this example, service host 36 does not need to invoke additional Web services in response to message 97; therefore, service host 36 sends (103) a reply 104 to service host 49 in response to message 97. Reply 104 may include, in its SOAP header, an identifier for service host 36 and its IP address, i.e., S3IP3. Service host 49 receives (105) reply 104, extracts whatever content is needed to satisfy message 90 (from service host 44), and generates (105) a reply 106 to message 90. Service host 49 sends (107) reply 106 to service host 44 in response to message 90. Reply 106 may include, in its SOAP header, an identifier for service host 49 and its IP address, i.e., S2IP2, along with the identifier and IP address of service host 36 (i.e., S3IP3). Service host 44 receives (109) reply 106, extracts whatever content is needed to satisfy message 82 (from client 24), generates (110) a reply 111 to message 82, and sends (112) reply 111 to client 24. Reply 111 may include, in its SOAP header, an identifier for service host 44 and its IP address, i.e., S1IP1, along with the identifier and IP address of service host 49 (i.e., S2IP2) and the identifier and IP address of service host 36 (i.e., S3IP3). Thus, along with a response to its original message, client 24 may receive S1IP1, S2IP2, and S3IP3.

Client 24 receives (113) reply 111, and retrieves (114) one or more trace files from trace server 39 based on the reply. For example, client 24 may retrieve debug information from trace server 39 using the IP addresses of the service hosts that were invoked in response to its original message (since those addresses are stored in association with the service hosts' activities in trace server 39). Alternatively, client 24 may retrieve information from trace server 31 using the identifiers. For example, service host 44 may provide its identifier 86 (ID1) to client 24 (e.g., as part of reply message 111). Because the identifier ID1 is associated with activities of all the service hosts, conducting a search for identifier ID1 in trace server 39 will retrieve all activities of all service hosts. The additional identifiers, ID2, ID3, etc., correlate specific activities to specific service hosts.

Thus, as was the case above, by propagating debug information in accordance with process 80, a user at device 16 is able to trace the services, operations, and messages resulting from its original request (message 82). This embodiment reduces the amount of data that propagates through external network 19, making this embodiment particularly advantageous for expansive networks involving numerous calls to service hosts.

As noted, client 24 may provide the IP address of trace server 39 (or other servers(s)) in its original message 82 to service host 44. Service host 44 may propagate the IP address of trace server 39 to service host 49, and so on. In this way, each service host may be apprised of the address of trace server 39, enabling client 24 to "decide" where to store debug information from the various service hosts. Furthermore, this eliminates the need to pre-program each device in network 19 with the address of trace server 39.

In still other embodiments, the various service hosts may provide the IP addresses of trace server(s) in which the service hosts have stored the debug information. For example, client 24 may not know beforehand the address of a trace server (or trace servers) to which service hosts 44, 49 and 36 store their debug information. Accordingly, each service host may provide, in a reply message, the IP address of a trace server to which that service host has stored its debug information. The service host who receives the reply message may then store its debug information in the same, or a different, trace server, thereafter providing, in a reply message, the IP address (or IP addresses) of server(s) in which the debug information is stored. For example, service host 36 may store its debug information in a trace server having an IP address of "IP36". This information may be provided, e.g., in the header of reply message 104, to service host 49. Service host 49 may then store its debug information in the same trace server or in a different trace server, e.g., a trace server having an IP address of "IP49". In the former case, service host 49 propagates "IP36" to service host 44 and, in the latter case, service host 49 propagates "IP36" and "IP49" to service host 44. Service host 44 then proceeds in the same manner. The result is that client 24 obtains one or more addresses indicating where debug information is stored. These addresses are correlated, in the reply messages, to corresponding debug information, enabling client 24 to access the desired information at the appropriate address.

Processes 40 and 80 may be employed in a grid network, or those processes may be implemented in connection with a grid network (e.g., a grid network may be part of external network 19). In grid computing, disparate computers and systems in an organization, or among organizations, are configured to operate as one large, integrated computing system. That is, grid computing is a form of distributed computing that harnesses unused processing cycles of all computers in a network to solve problems that are too complex for any one machine. Grid computing enables selection, aggregation, and sharing of information resources resident in multiple administrative domains and across geographic areas. The information resources are shared, for example, based upon their availability, capability, and cost, as well as a user's quality of service (QoS) requirements.

Figure 6:
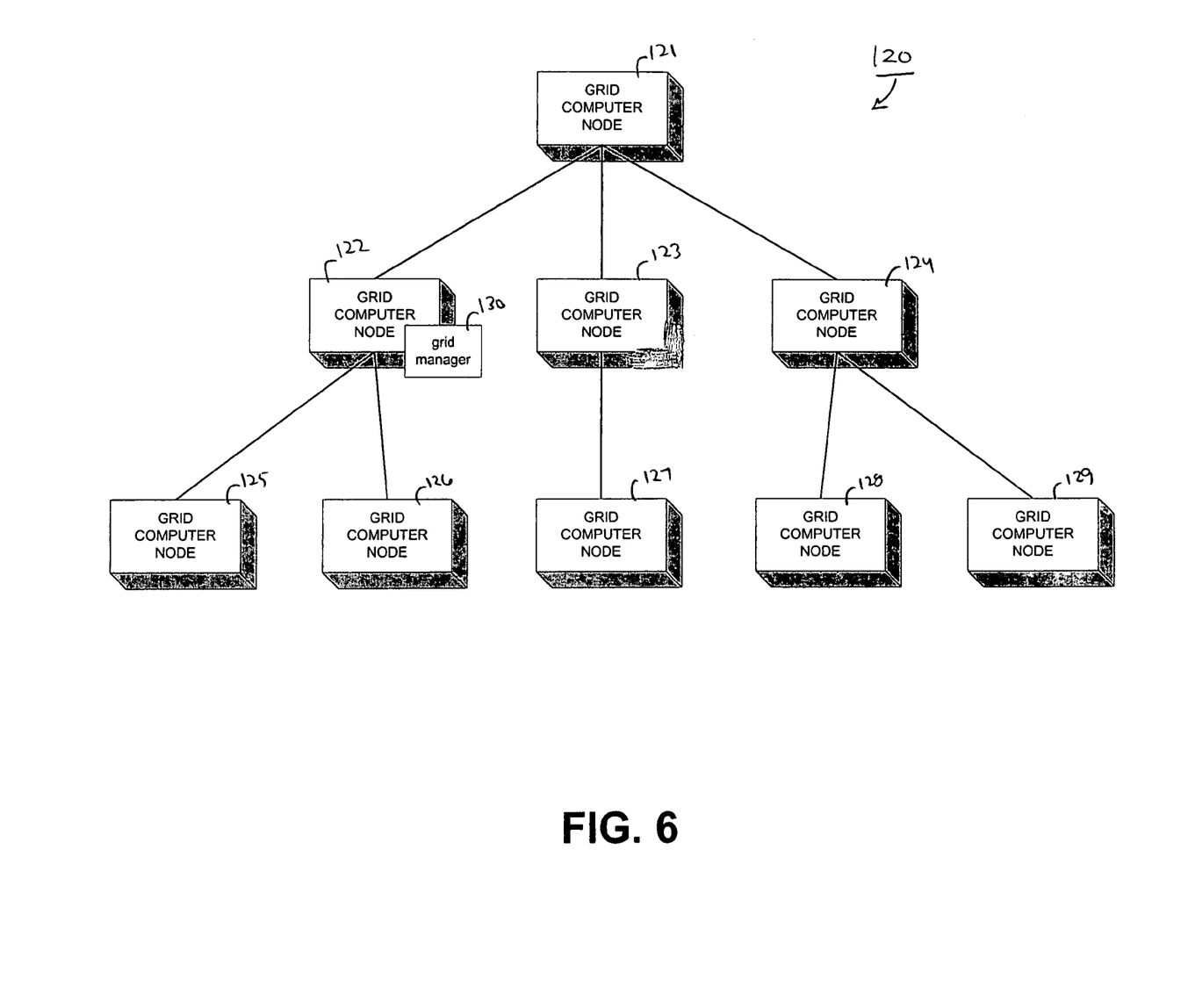
FIG. 6 is a block diagram of a grid network, on which the debug propagation processes described herein may be implemented.

As shown in FIG. 6, a grid computing network 120 includes a number of interconnected grid nodes 121 to 129. Each grid node, such as node 121, may act as a client or as a service host when implementing processes 40 or 80. Software for performing these functions may be loaded onto, and thereafter executed on, one or more of grid nodes 121 to 129 in the manner described below.

Grid network 120 is organized as a hierarchical tree structure. This hierarchical tree structure is maintained by grid managers, which are resident in each of grid nodes 121 to 129. Grid managers implement special management services in network 120. In every grid node 121 to 129 within network 120, there is a single grid manager, which ensures that a grid manager hierarchy is maintained by the network devices within grid network 120.

Within network 120, grid managers can be classified as superior grid managers or inferior grid managers. A superior grid manager can have more than one inferior grid managers. Similarly, an inferior grid manager can have more than one superior grid managers. By way of example, a grid manager 130 in node 122 may act as a superior grid manager relative to the grid managers in nodes 125, 126. Grid manager 130 may also be inferior to one or more other grid managers (not shown) in network 120.

A superior grid manager maintains a list of all connected inferior grid managers, and an "always open" connection to grid managers in the list using, e.g., transmission control protocol (TCP), hypertext transfer protocol (HTTP), and/or simple object access protocol (SOAP). An inferior grid manager is connected via an "always open" connection to its superior grid manager(s). In network 120, each grid manager can take on the role of a superior grid manager or an inferior grid manager at any time, allowing for dynamic reconfiguration of the grid network hierarchy during run-time.

Grid network 120 uses special management services provided by the grid managers. In this regard, it often happens that the functionality of these services needs to be enhanced, but it is often not possible to shut down network 120 at any time. Accordingly, changes to grid network 120 may be made while the network is still up and running. Users of grid network 120 should not notice that a change has occurred, but rather simply have access to new functionality. To enable such changes, a static, yet dynamic application program interface (API) is provided to access each of the grid managers in each of the grid nodes 121 to 129. The API may include only one process, i.e., a string that contains a command line. Dynamic access to code without changing the grid manager can be effected, for example, by loading Java® classes dynamically via classloaders.

An application (not shown) running in grid network 120 includes instructions on how to install, customize, track and remove an instance of the application from a grid node. In operation, the application is transferred from a regulator or controller to a local grid node using file transfer protocol (FTP) or hypertext transfer protocol (HTTP). The application may be transferred, e.g., as a single file, such as a zip file.

The zip file in which the application is transferred may include information about installing and customizing the application. This information may include a small executable program or extended markup language (XML) document that is interpreted by an installation and customizing engine in the local grid node. During installation, customization and execution of the application, all changes to the local grid node are logged, along with other relevant information associated with execution of the application. When the application terminates, the application and log files are removed from the local grid node, along with any changes to the local grid node. Thus, the local grid node reverts to its original state prior to execution of the application, and all of its resources may again available for use by a subsequent application.

An application start protocol ensures that applications get the necessary resources allocated in the grid network 120 before actually trying to run on a grid node. The application start protocol also ensures that if similar applications are trying to start at the same time at the same grid node, that the two applications do not collide or otherwise interfere with each other. The application start protocol functions as follows.

An application running in grid network 120 queries a local or remote grid manager before starting. This is done in order to determine if there are grid nodes available on which the application can operate. The query contains resource requirements the application requires for operation, such as required number of processors, main memory, and network speed. The query can also contain information to which hierarchy level in the grid network the query should be propagated. In response, the application receives a list of available nodes in grid network 120 that are ready to run the application. The application requesting resources for execution selects a grid node and contacts the grid manager residing on that selected grid node. The application asks the grid manager in the selected grid node for a reservation. "Reservation", in this context, means that the application requesting services is guaranteed/allocated the resources on the selected grid node. If the reservation is granted (i.e., succeeds), the application gets a reservation number. If the reservation fails, the application selects the next available grid node in the list. If the application receives a registration number, to start running on the selected grid node, the application passes the reservation number during startup to the grid manager residing in the selected grid node. If the application does not start executing on the selected grid node within a predefined time, the reservation number expires. In this case, the foregoing process must be repeated in order for the application to obtain another reservation number.

The application start protocol provides a classification if two applications are similar, i.e., the applications belong to a family of application types, and are trying to access the same resources. If two applications of the same family are trying to start on the same grid node, a semaphore mechanism ensures that one application starts after the other.

In programming, a semaphore is a technique for coordinating or synchronizing activities in which multiple processes compete for the same operating system resources. A semaphore is a value in a designated place in operating system (or kernel) storage that each process can check and then change. Depending on the value that is found, the process can use the resource or will find that it is already in use and must wait for some period before trying again. Semaphores can be binary (0 or 1) or can have additional values. Typically, a process using semaphores checks the value and then, if it using the resource, changes the value to reflect this so that subsequent semaphore users will know to wait.

Operating systems control of application processes is specific to the operating system (OS) implemented on each grid node. In order to be managed by a grid manager, a grid node has a generic and standard interface to discover, control (e.g., start, stop, halt, resume) and inspect or monitor a state of application processes. The interface is provided for operating system processes that are exposed by the operating system or hosting environment and includes three aspects. A first aspect is process data, such as process identification, states, degree of resource consumption (such as CPU, memory, socket bindings, or other resources and application can use), and application specific data defined by a process data scheme. A second aspect is managing operations, such as start, stop, wait, resume, change priority, and other operation defined by a supported managing operations. A third aspect is control bindings and definitions, such as process data scheme, supported managing operations, and communication bindings.

Client 24 may send a message 42 or 82 to grid network 120. Grid node 121 may receive the message and attempt to satisfy a request in the message by employing the services of one or more other grid nodes 122 to 129, e.g., to execute one or more applications in response to the message. If the request cannot be satisfied by grid network 120, grid node 121 may call another service host, requesting Web services from the other service host and instructing that service host either to propagate debug information in accordance with process 40 or to log debug information in accordance with process 80.

Instead of acting as a service host, grid node 121 may perform the functions of client 24, e.g., by sending a message to a service host, which also requests debug information, and receiving a response in the manner described above.

Processes 40 and 80 may be implemented inside a grid network. For example, grid node 121 may operate as the client and grid nodes 122 to 129 may operate as service hosts.

Processes 40 and 80 and their various modifications described above (referred to collectively as "the debug propagation processes") are not limited to use with the hardware and software described above; they may find applicability in any computing or processing environment and with any type of machine that is capable of running machine-readable instructions. The debug propagation processes can be implemented in digital electronic circuitry, or in computer hardware, firmware, software, or in combinations thereof.

The debug propagation processes can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the debug propagation processes can be performed by one or more programmable processors executing one or more computer programs to perform the functions of the debug propagation processes. The method steps can also be performed by, and the debug propagation processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The debug propagation processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the debug propagation processes, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the debug propagation processes can be rearranged and/or one or more such steps can be omitted to achieve the same results described herein. The debug propagation processes may be fully automated, meaning that they operate without user intervention, or interactive, meaning that all or part of the debug propagation processes may include some user intervention.

The invention is not limited to use with three service hosts, but rather may be used with any number N (N>2) service hosts, each of which receives, from an $N-1^{th}$ service host, a message requesting debug information from an $N^{th}$ service host. In this case, the debug information may comprise information relating to each of the N service hosts.

Elements of different embodiments described herein may be combined to form other embodiments not specifically set forth above. Other embodiments not specifically described herein are also within the scope of the following claims.

What is claimed is:

1. A method, performed by a target service host, for propagating debug information in a network that supports Web services, the method comprising:
   responsive to a request from a client separated from service hosts by a firewall, initiating communication with a first service host and a second service host;
   receiving, from the first service host, a first message corresponding to a first request for debug information;
   sending, to the second service host, a second message in response to the first message, the second message configured by the target service host to comprise second data corresponding to a second request for debug information;
   receiving a reply to the second message, the reply to the second message configured by the second service host to comprise second debug information associated with the second service host; and
   sending a reply to the first message, the reply to the first message configured by the target service host to comprise the second debug information and current debug information associated with the target service host, the first debug information and the current debug information being further propagated to the client.

2. The method of claim 1, wherein the current debug information identifies one or more of the target service host, an operation performed by the target service host, and the first message; and
   wherein the second debug information identifies one or more of the second service host, an operation performed by the second service host, and the second message.

3. The method of claim 2, wherein the current debug information comprises a network address of the target service host, and the second debug information comprises a network address of the second service host.

4. The method of claim 1, wherein the first message comprises first data stored in a header of the first message, and the second data is stored in a header of the second message, the first data and the second data each comprising a bit that is set to indicate the first and second requests for debug information.

5. A method, performed by a target service host, for propagating debug information in a network that supports Web services, the method comprising:
   responsive to a request from a client separated from service hosts by a firewall, initiating communication between the target service host and a second service host;
   receiving a first message containing an instruction to log debug information and a first identifier that corresponds to an activity performed by a sender of the first message;
   logging debug information for the target service host in accordance with the instruction, the debug information being logged in association with a combination of the first identifier and a second identifier that corresponds to an activity performed by the target service host; and
   sending a second message to the second service host, the second message configured by the target service host to comprise an instruction to log debug information and the combination of the first identifier and the second identifier, the debug information being further propagated to the client.

6. The method of claim 5, wherein the instruction comprises information associated with a trace server, and wherein the debug information is logged in the trace server.

7. The method of claim 6, wherein the information associated with the trace server comprises a network address of the trace server.

8. The method of claim 5, further comprising:
   receiving a reply to the second message from the second service host, the reply to the second message comprising a network address of the second service host; and
   sending a reply to the first message, the reply to the first message comprising the network address of the second service host and a network address of the target service host.

9. A method, performed by a client that makes an original request in a network, of obtaining debug information in the network that supports Web services, the network comprising at least a first service host and a second service host that is called by the first service host in response to a message, the method comprising:
   sending the message to the first service host, the message containing data instructing the first service host to log debug information at a network address;
   retrieving a trace file from the network address that was generated in response to the message, the trace file containing an entry comprising a first identifier that corresponds to the first service host and an entry comprising the first identifier and a second identifier that corresponds to the second service host;
   obtaining the first identifier and the second identifier from the trace file; and
   identifying activities performed in response to the first message based on at least one of the first identifier and the second identifier,
   wherein a firewall is configured to handle communication between the client and the first service host.

10. The method of claim 9, wherein:
    the network comprises N (N>2) service hosts, each of the N service hosts receiving, from an $N-1^{th}$ service host, a message containing data instructing an $N^{th}$ service host to log debug information at the network address;
    the trace file contains N entries corresponding to each of the N services hosts, where an entry for an $N^{th}$ service host comprises an identifier that corresponds to the $N^{th}$ service host and identifiers that correspond to a first service host through an $N-1^{th}$ service host that precede the $N^{th}$ service host in a communication path from the client to the $N^{th}$ service host;
    obtaining comprises obtaining N identifiers corresponding to the N service hosts; and identifying comprises identifying activities performed in response to the first message based on at least one of the N identifiers.

11. The method of claim 9, wherein identifying comprises searching the trace file using the first identifier to obtain a trace of all activities performed in response to the first message.

12. The method of claim 9, further comprising:
receiving, in a reply to the first message, first information identifying the first service host and second information identifying the second service host, the first information comprising a network address of the first service host and the second information comprising a network address of the second service host.

13. A system for obtaining debug information in a network that supports Web services, the system comprising:
system memory;
a first service host to send a first message to the network, the first message configured by the first service host to contain data comprising a request to log debug information and a first identifier that corresponds to a first activity performed by the first service host, the first service host storing the first identifier in the system memory;
a second service host to receive the first message and to generate a second message in response to the first message, the second service host sending the second message to the network, the second message configured by the second service host to contain data comprising a request to log debug information and both the first identifier and a second identifier that corresponds to a second activity performed by the second service host, the second service host storing both the first identifier and the second identifier in the system memory; and
a client separated from the first service host by a firewall and configured to communicate an original request in the network and receive debug information from the network.

14. The system of claim 13, further comprising:
a third service host to receive the second message and to send a reply to the second message;
wherein the second service host receives a reply to the second message from the third service host, the reply containing a network address of the third service host; and
wherein the first service host receives a reply to the first message from the second service host, the reply containing a network address of the second service host.

15. A computer program product for use by a target service host in propagating debug information in a network that supports Web services, the computer program product being tangibly embodied in a storage device, the computer program product comprising instructions that cause the target service host to:
responsive to a request from a client separated from service hosts by a firewall, initiate communication with a first service host and a second service host;
receive, from the first service host, a first message configured by the first service host to comprise data corresponding to a first request for debug information;
send, to the second service host, a second message in response to the first message, the second message configured by the target service host to comprise second data corresponding to a second request for debug information;
receive a reply to the second message, the reply to the second message configured by the second service host to comprise second debug information associated with the second service host; and
send a reply to the first message, the reply to the first message configured by the target service host to comprise the second debug information and current debug information associated with the target service host, the second debug information and the current debug information being further propagated to the client.

16. A computer program product for use by a target service host in propagating debug information in a network that supports Web services, the computer program product being tangibly embodied in a storage device, the computer program product comprising instructions that cause the target service host to:
responsive to a request from a client separated from service hosts by a firewall, initiate communication between the target service host and a second service host;
receive a first message containing an instruction to log debug information and a first identifier that corresponds to an activity performed by a sender of the first message;
log debug information for the target service host in accordance with the instruction, the debug information being logged with a combination of the first identifier and a second identifier, wherein the logging additionally indicates an association between the debug information and the combination of the first identifier and the second identifier, the second identifier corresponding to an activity performed by the target service host; and
send a second message to the second service host, the second message configured by the target service host to comprise an instruction to log debug information and the combination of the first identifier and the second identifier, the debug information being further propagated to the client.

17. A computer program product, for use by a network client that makes an original request in a network, to obtain debug information in the network that supports Web services, the network comprising at least a first service host and a second service host that is called by the first service host in response to a message, the computer program product being tangibly embodied in a storage device, the computer program product comprising instructions that cause the network client to:
send the message to the first service host, the message containing data instructing the first service host to log debug information at a network address;
retrieve a trace file from the network address that was generated in response to the message, the trace file containing an entry comprising a first identifier that corresponds to the first service host and an entry comprising the first identifier and a second identifier that corresponds to the second service host;
obtain the first identifier and the second identifier from the trace file; and
identify activities performed in response to the first message based on at least one of the first identifier and the second identifier, wherein a firewall is configured to handle communication between the network client and the first service host.

* * * * *

UNITED STATES PATENT AND TRADEMARK OFFICE
CERTIFICATE OF CORRECTION

PATENT NO.        : 7,661,030 B2                                               Page 1 of 1
APPLICATION NO.  : 11/000349
DATED             : February 9, 2010
INVENTOR(S)       : Bozak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Thirtieth Day of November, 2010

David J. Kappos
*Director of the United States Patent and Trademark Office*